(12) United States Patent
Stava

(10) Patent No.: US 9,688,024 B2
(45) Date of Patent: Jun. 27, 2017

(54) ADAPTIVE SUPPORTS FOR 3D PRINTING

(71) Applicant: Adobe Systems Incorporated, San Jose, CA (US)

(72) Inventor: Ondrej Stava, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 824 days.

(21) Appl. No.: 14/014,713

(22) Filed: Aug. 30, 2013

(65) Prior Publication Data

US 2015/0066178 A1    Mar. 5, 2015

(51) Int. Cl.
*B29C 67/00* (2006.01)
*B33Y 50/00* (2015.01)

(52) U.S. Cl.
CPC ...... *B29C 67/0088* (2013.01); *B29C 67/0092* (2013.01); *B33Y 50/00* (2014.12)

(58) Field of Classification Search
CPC .. B29C 67/0088; B29C 67/0092; B33Y 50/00
USPC .......................................................... 700/98
See application file for complete search history.

(56) References Cited

U.S. PATENT DOCUMENTS

| 5,321,622 | A * | 6/1994 | Snead | B29C 67/0062 345/419 |
|---|---|---|---|---|
| 5,454,069 | A * | 9/1995 | Knapp | G06T 17/00 345/420 |
| 6,201,988 | B1 | 3/2001 | Bourland et al. | |
| 6,558,606 | B1 * | 5/2003 | Kulkarni | B29C 67/007 264/401 |
| 6,708,071 | B1 * | 3/2004 | Turner | G05B 19/4097 345/419 |
| 2002/0143419 | A1 * | 10/2002 | Praun | G06T 17/20 700/98 |
| 2003/0178750 | A1 * | 9/2003 | Kulkarni | B29C 67/007 264/401 |

(Continued)

OTHER PUBLICATIONS

Liu et al., "Extended Grassfire Transform on Medial Axes of 2D Shapes", Computer-Aided Design, Solid and Physical Modeling, vol. 43, Issue 11, Nov. 2011, pp. 1496-1505.

(Continued)

*Primary Examiner* — Jason Lin
(74) *Attorney, Agent, or Firm* — Kilpatrick Townsend & Stockton LLP

(57) ABSTRACT

Methods and systems for defining adaptive support structures for three dimensional (3D) printing are disclosed. An exemplary method detects an area of a 3D model needing support and generates contact points for the area. The method creates a set of virtual supports that extend downward from respective contact points and then identifies connections between the virtual supports in the set, the connections satisfying connection constraints. Next, a virtual support in the set is selected to be a trunk based on comparing connectivity levels of virtual supports in the set, the connectivity level of each of the virtual supports determined by a number of connections between the respective virtual support and other virtual supports. The method then defines a support structure originating from the contact points and including the trunk, at least one virtual support connected to the trunk, and connections between the trunk and the at least one virtual support.

19 Claims, 13 Drawing Sheets

(56) References Cited

U.S. PATENT DOCUMENTS

| | | | |
|---|---|---|---|
| 2004/0008868 A1* | 1/2004 | Bornowski | G01S 7/4802 |
| | | | 382/103 |
| 2004/0075196 A1* | 4/2004 | Leyden | B29C 41/12 |
| | | | 264/401 |
| 2005/0131570 A1* | 6/2005 | Jamalabad | B29C 67/0092 |
| | | | 700/119 |
| 2006/0198975 A1* | 9/2006 | Kikuchi | B29C 65/3656 |
| | | | 428/35.8 |
| 2008/0040080 A1* | 2/2008 | Bae | G06F 17/50 |
| | | | 703/1 |
| 2008/0100326 A1* | 5/2008 | Chen | G01R 1/0483 |
| | | | 324/755.07 |
| 2008/0234687 A1* | 9/2008 | Schaller | A61B 17/8852 |
| | | | 606/90 |
| 2008/0273777 A1 | 11/2008 | Luboz et al. | |
| 2010/0066760 A1 | 3/2010 | Mitra et al. | |
| 2012/0010741 A1* | 1/2012 | Hull | B29C 67/0092 |
| | | | 700/98 |
| 2012/0209394 A1 | 8/2012 | Bojarski et al. | |
| 2013/0211531 A1 | 8/2013 | Steines et al. | |
| 2014/0228860 A1 | 8/2014 | Steines et al. | |
| 2015/0066179 A1 | 3/2015 | Stava | |

OTHER PUBLICATIONS

Tam et al., "Shape Simplification Based on the Medial Axis Transform", Oct. 19-24, 2003.

* cited by examiner

ADAPTIVE SUPPORTS FOR 3D PRINTING

TECHNICAL FIELD

This disclosure relates generally to computer-implemented methods and systems for three-dimensional (3D) printing and more particularly relates to systems and methods for defining adaptive support structures for 3D printing of objects having overhanging features.

BACKGROUND

Three-dimensional (3D) printing is a type of additive manufacturing where the shape of printed objects is modeled incrementally, layer by layer. 3D printing is a process of making a 3D solid object from a digital model, where successive layers of material are laid down (i.e., by a 3D printer) in different shapes. After one layer is printed, the next layer is placed on top of it. This approach can lead to problems when printing objects with overhangs or geometry that is not directly connected to the ground, a printing platform or pad, or other supportive surface. This is because, in such cases, material is printed in empty space without any support from previous layers. For a 3D object with overhangs or other floating features not connected to the ground, there are not underlying layers of the objects to support the overhangs. One solution to overcome this problem is to print supporting material below the problematic, overhanging features. Such supporting material can hold the overhangs and be removed after the printing is finished. For some existing 3D printing technologies, the supporting material can be dissolved or washed away from the solid 3D object after printing is completed. However, for other 3D printing methods, such as fused deposition modeling (FDM) or stereolithography, the material used for the supporting structure is typically identical to the material of the printed object. In these cases, such supporting material has to be removed mechanically using force or specialized tools. The drawback of these traditional solutions is that once removed, the supporting material can leave marks on the printed object. This can greatly degrade the quality of the printed object. A traditional technique for constructing a supporting structure involves projecting areas that need support down towards the ground. Such projections can then be used to define the shape of the supporting structure. One drawback of this technique is that it creates many unwanted contacts and intersections between the supporting structure and the printed object, which degrades the quality of resulting object.

SUMMARY

In one embodiment, a method includes detecting, by a computing device, at least one area of a three dimensional (3D) model that needs to be supported. The method then generates contact points for the at least one area and creates a set of virtual supports, each virtual support in the set extending downward from a respective one of the contact points. Then, the method identifies connections between the virtual supports in the set such that the connections satisfy one or more connection constraints. Next, the method selects a virtual support in the set to be a trunk. The selection involves comparing connectivity levels of each of the virtual supports in the set. The connectivity level of each of the virtual supports is based on a number of connections between the respective virtual support and other virtual supports in the set. At this point, the method defines a support structure originating from the contact points and extending downward towards a surface. The support structure is defined so that it includes the trunk, at least one virtual support connected to the trunk, and connections between the trunk and the at least one virtual support in the support structure.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
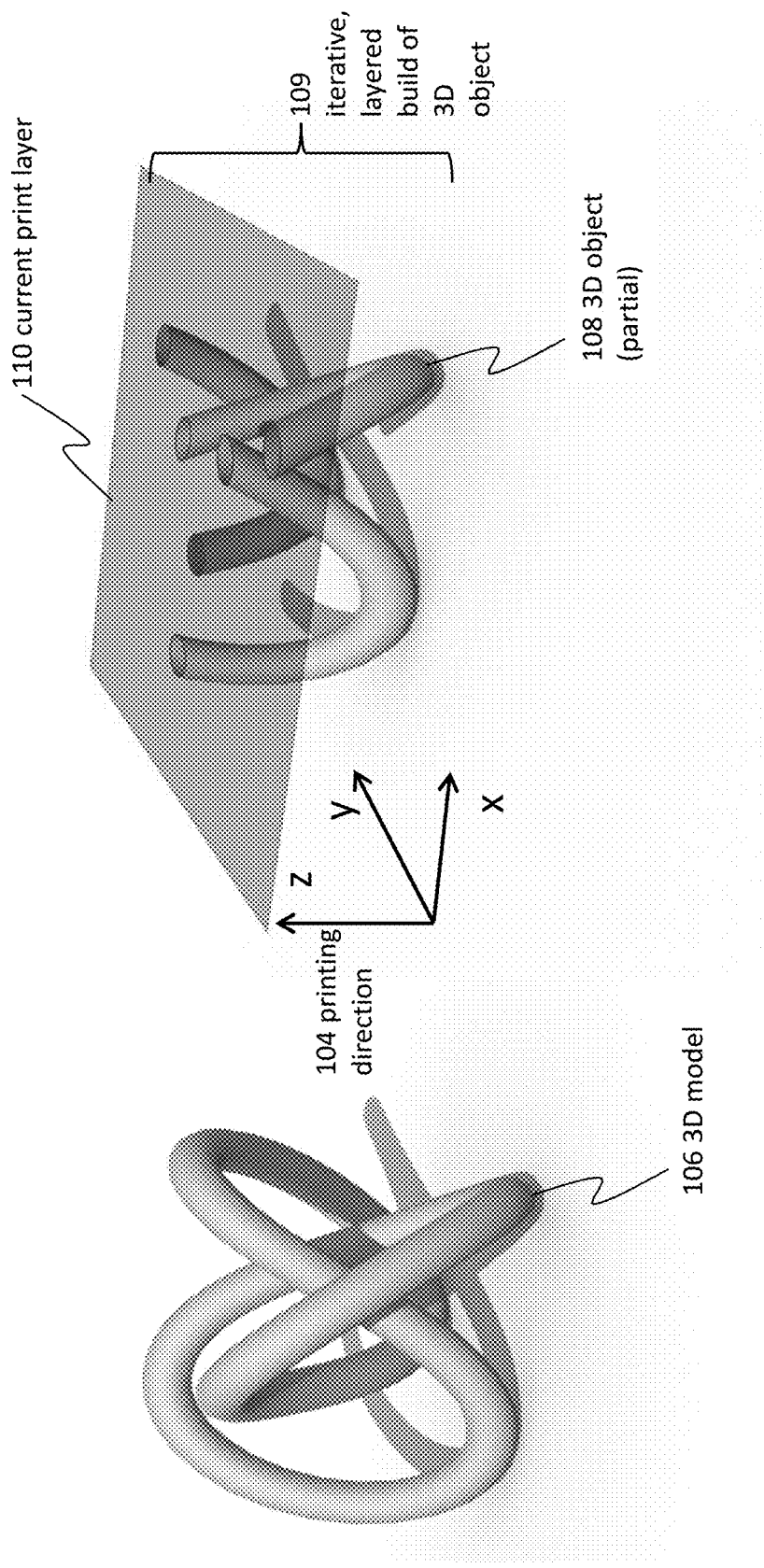
FIG. 1 illustrates an iterative approach to building a shape corresponding to a three dimensional (3D) object, in accordance with embodiments.

Methods and systems are disclosed for creating support structures that minimize the contact area between elements of the support structures and a printed 3D object corresponding to a 3D model. Exemplary methods improve the final output quality for output devices such as 3D printers that need to print support structures with the same material used to create (i.e., print) the 3D object. Embodiments define support structures whose elements have a tree-like structure with ends of branches being connected to a 3D object at contact points. In embodiments, the contact points are relatively thin connectors as compared to other elements of the support structure so that the connectors are easily removable from the 3D object. According to an embodiment, locations of inner branches of the tree-like support structure are automatically generated to avoid unwanted intersections and contacts between the support structure and the printed model (i.e., the 3D object).

In certain embodiments, the root of the tree-like support structure can be placed on a printer platform, printing pad, or printing raft of a 3D printer to be used to create the 3D object. This can make elements of the support structure easier to remove and limit contacts between the support structure and printed object. An embodiment ensures that elements of a defined support structure print correctly and that they do not break during the printing process by automatically calculating the thickness of individual elements, such as trunks and other supports, contact points, and connections (i.e., elements connecting a trunk to another support or a contact point) so that resulting support structure is structurally sound.

Embodiments define adaptive support structures so that contact areas with a printed model (i.e., a 3D object corresponding to a 3D model) are reduced or minimized, which can improve the quality of the final printed object. Exemplary support structures are defined so as to have smaller contact areas so that elements of the structures will be more easily removable from a printed 3D object. The exemplary adaptive support structures described herein can also result in lower 3D printing material usage and faster printing times. Support structures defined, modeled, and constructed using the exemplary methods and systems described herein are adaptive in they can be modified to adapt to various 3D models, output device properties, tunable constraints, and output parameters. For example, embodiments can revise a support structure previously defined for a 3D model based upon changes to parameters and settings in a printer profile of a 3D printer selected as an output device for that 3D model.

Once designed (i.e., defined), exemplary adaptive support structures can be dynamically revised in response to changes to a 3D model or output parameters. For example, in response to a selection of a different printing material, output size, or other parameter for a given 3D model, embodiments can adapt (i.e., change) a support structure that was previously-defined for that 3D model.

In an embodiment, a computer readable storage medium has executable instructions stored thereon, that if executed by a by a processor of a computing device, cause the processor to perform operations. The instructions comprise instructions for detecting at least one area of a three dimensional (3D) model that needs to be supported; generating contact points for the at least one area; and creating a set of virtual supports. According to this embodiment, each virtual support in the set extends downward from a respective one of the contact points. The computer readable storage medium also has instructions for identifying connections between the virtual supports in the set such that the connections satisfying one or more connection constraints. The computer readable storage medium has further instructions for instructions for selecting a virtual support in the set to be a trunk, the selecting based on comparing connectivity levels of the virtual supports in the set. The connectivity level of each of the virtual supports in the set is determined based on a number of connections between the respective virtual support and other virtual supports in the set. The computer readable storage medium has further instructions for defining a support structure for the 3D model, the support structure including the trunk, virtual supports connected to the trunk, and connections between the trunk and the virtual supports in an adaptive support structure.

According to another embodiment, a system includes a computing device having a processor and a memory with instructions stored thereon, that, if executed by the processor, cause the processor to perform operations. The operations comprise generating contact points for at least one area of a three dimensional (3D) model that needs to be supported and creating a set of virtual supports so that each virtual support in the set extends downward from a respective one of the contact points. The operations also include identifying connections between the virtual supports in the set such that the connections satisfy one or more connection constraints. The operations further include selecting a virtual support in the set to be a trunk. The selecting is based on comparing connectivity levels of the virtual supports in the set, wherein the connectivity level of each of the virtual supports in the set is based on a number of connections between the respective virtual support and other virtual supports in the set. The operations also define an adaptive support structure for the 3D model, wherein the adaptive support structure includes the trunk, virtual supports connected to the trunk, and connections between the trunk and the virtual supports. The operations also comprise determining whether to extend the selected trunk downward, with respect to the contact points, towards a surface.

Yet another embodiment provides a system for defining an adaptive support structure by converting a received 3D model into a plurality of two dimensional (2D) layers, detecting one or more areas of the three dimensional (3D) model that need to be supported, and then generating contact points for the one or more areas in portions of respective ones of the plurality of 2D layers comprising the one or more areas. For example, the system can be configured to convert the 3D model into the 2D layers, where the 2D layers extend upward from a plane, such as a printer platform (see, e.g., printer platform 210 in FIG. 2), or a printing raft or pad. According to this embodiment, a first one of the 2D layers is coincident with the plane and each successive one of the 2D layers is above one or more preceding 2D layers. The system can detect that a portion of a given 2D layer needs to be supported by determining if the greater of a distance: between the portion and a surface; and between the portion and a preceding, lower 2D layer exceeds a maximum distance. In embodiments, such a maximum distance can be based on properties of an output device (i.e., a 3D printer) and an output material (i.e., a type of plastic) selected to create a 3D object corresponding to the 3D model. The system can then generate the contact points in detected portions of the 2D layers. The system can be configured to distribute the contact points substantially uniformly across the one or more areas so that each of the contact points is substantially the same distance from neighboring contact points. This substantially same distance can be based on properties of an output device selected to produce a 3D objection corresponding to the 3D model. For example, this substantially uniform distance can be based on properties of a 3D printer.

Exemplary methods, computer readable media, and systems are provided for creating a set of virtual supports for generated contact points such that each virtual support in the set extends downward from a respective one of the generated contact points. Connections between the virtual supports in the set are then identified such that the connections satisfy connection constraints. As used herein, the term "contact point" refers to a point where an end of a virtual support or a connection connected to a virtual support comes into contact with an area of a 3D object. Contact points can be generated for an area on that overhang that needs to be supported. Contact points can be designed to be thinner than widths of virtual supports or connections. In a tree-like support structure, contact points can be conceptualized as leaves (see, e.g. contact points 410 in FIGS. 4, 6A, and 6B).

Figure 4:
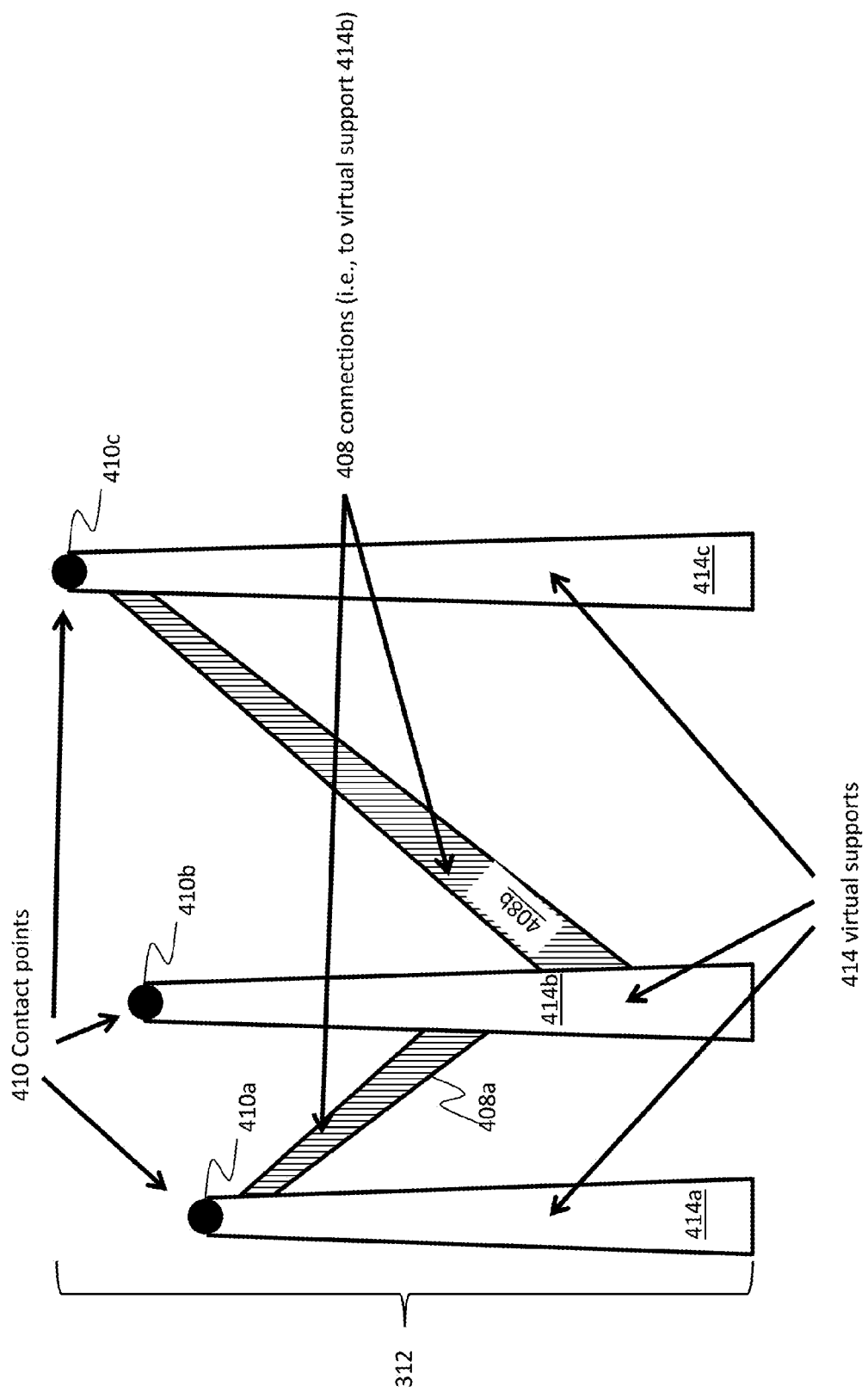
FIG. 4 illustrates a support structure including connected supports and contact points, in accordance with embodiments.

As used herein, the term "connection" refers to an element of a support structure connecting a virtual support to a contact point or another virtual support. Connections can be used to connect a virtual support selected to be a trunk to another virtual support. In a tree-like support structure, connections can be conceptualized as branches (see, e.g., connections 408 in FIGS. 4, 6A, and 6B). As used herein, the term "trunk" refers to a virtual support element of a support structure with incoming connections connecting the trunk virtual support to one or more contact points and/or other virtual supports. A support structure can have one or more trunks that are substantially vertical with respect to a printing surface (see, e.g., printer platform 210 in FIG. 2). In a 3D coordinate system, trunks can extend along a Z-axis aligned with a printing direction (see, e.g., print direction 104 in FIG. 1) so that they are substantially perpendicular to an X-axis aligned with a printing surface. For example, as shown in FIGS. 4 and 6B, a connection 408*a* can connect a virtual support 414*a* to a trunk virtual support 414*b*. Also, for example, as shown in FIG. 6B, a connection 408*a* can connect a first, virtual trunk support 414*a*, to another virtual trunk support 414*b*. Connection constraints can include, for example, an intersection constraint restricting connections determined to intersect with a given 3D model, a length constraint limiting connections to a maximum length, a slope constraint requiring connections to have a minimum slope, and/or an angle constraint. Exemplary angle constraints can be used to restrict connections to one or more of a maximum angle with respect to a virtual support and a minimum angle with respect to a surface, such as a printing platform, a printer raft, or a printer pad of a selected 3D printer.

After identifying connections that satisfy such constraints, the exemplary methods, computer readable media, and systems can be used to select virtual support in the set to be a trunk by comparing connectivity levels of the virtual supports in the set. Certain embodiments select the trunk to be the virtual support having the most incoming connections from other virtual supports in the set. After the trunk is selected, a support structure can be defined that includes the trunk, any or all virtual supports in the set connected to the trunk, and the connections between the trunk and the virtual supports. Embodiments then remove the trunk and its connected virtual supports from the set and repeatedly identify connections between virtual supports remaining in the set, select trunks from the set, add the trunks to the support structure, and remove the trunks and their connected virtual supports from the set until the set is empty. These embodiments can define a support structure having multiple trunks extending downward from the contact points and supporting an overhang of a 3D model.

Additional embodiments are provided for creating multi-level support structures having multiple branch levels. The multiple branch levels can include connections to multiple levels of trunks. Such multi-level support structures can be created in cases where it is determined that a trunk in the support structure, if fully extended downward towards a printing surface (i.e., away from the contact points), will intersect with a 3D model. The embodiments can partially extend the trunk downward, with respect to the contact points, so that it does not intersect with the 3D model and then create a new set of virtual supports, wherein each virtual support in the new set has previously been selected to be another trunk in the support structure. The embodiments can use the new set to repeatedly identify connections between trunks remaining in the set, select a most-connected trunk from the set, add the trunk to the support structure, and remove the most-connected trunk and their connected trunks from the new set until the new set is empty. In this way, the support structure can be adapted or modified to include another trunk on lower level than the partially extended trunk and a connection between them, where the trunk on the lower level extends downward to the printing surface without intersecting with the 3D model. Through an iterative method, embodiments can create adaptive support structures with as many branch levels as needed, up to an established maximum branch level, in order to ensure that trunks do not intersect with a footprint of a 3D model while also providing adequate support for overhangs in the 3D model.

The following non-limiting examples are provided to help further introduce the general subject matter of certain embodiments.

As used herein, the term "output device" refers to any device capable of producing a 3D object corresponding to a 3D model. An output device can be, for example, a 3D printer. As used herein, the terms "output material" and "printing material" can refer to any material usable by an output device to produce a 3D object. Non-limiting examples of printing materials include plastics such as acrylonitrile butadiene styrene (ABS).

Unless specifically stated differently, a "user" is interchangeably used herein to identify a user account, a human user, or a software agent. Besides a human user who wishes to create 3D objects corresponding to a 3D model, a software application or agent sometimes needs to create 3D objects. Accordingly, unless specifically stated, the term "user" as used herein does not necessarily pertain to a human being.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

These illustrative examples are given to introduce the reader to the general subject matter discussed here and are not intended to limit the scope of the disclosed concepts. The following sections describe various additional embodiments and examples with reference to the accompanying. In the drawings, generally, common or like reference numbers indicate identical or functionally similar elements. Additionally, generally, the left-most digit(s) of a reference number identifies either the drawing in which the reference number first appears or the drawing in which a related element first appears. The following sections describe various additional embodiments and examples with reference to the drawings in which like numerals indicate like elements. For brevity, only the differences occurring within the Figures, as compared to previous or subsequent ones of the figures, are described below.

FIG. 1 illustrates an example 3D printing technique. As shown, a type of additive manufacturing technique can be used to create a 3D object 108 corresponding to a 3D model 106. The 3D object 108 is in the process of being built (i.e., it depicted in FIG. 1 in a partially built state). As shown, an iterative, layered build process 109 can be used to build the 3D object 108 corresponding to the 3D model 106. By using the layered build process 109, the shape of the printed 3D object 108 can be modeled incrementally, layer by layer, extending upward in a print direction 104 with successive two-dimensional (2D) layers being farther away from a printing surface (see printer platform 210 in FIG. 2) than preceding 2D layers. After one layer of the 3D object 108 is printed, the next layer is placed on top of it (i.e., at a current print layer 110). As discussed below, exemplary methods and systems disclosed herein address potential problems arising when printing a 3D model 106 with overhangs or geometry that is not connected to the printing surface (i.e., ground). Such problems can arise because material of the 3D object 108 at the current print layer 110 may be printed in empty space without any support from a preceding layer below.

Figure 2:
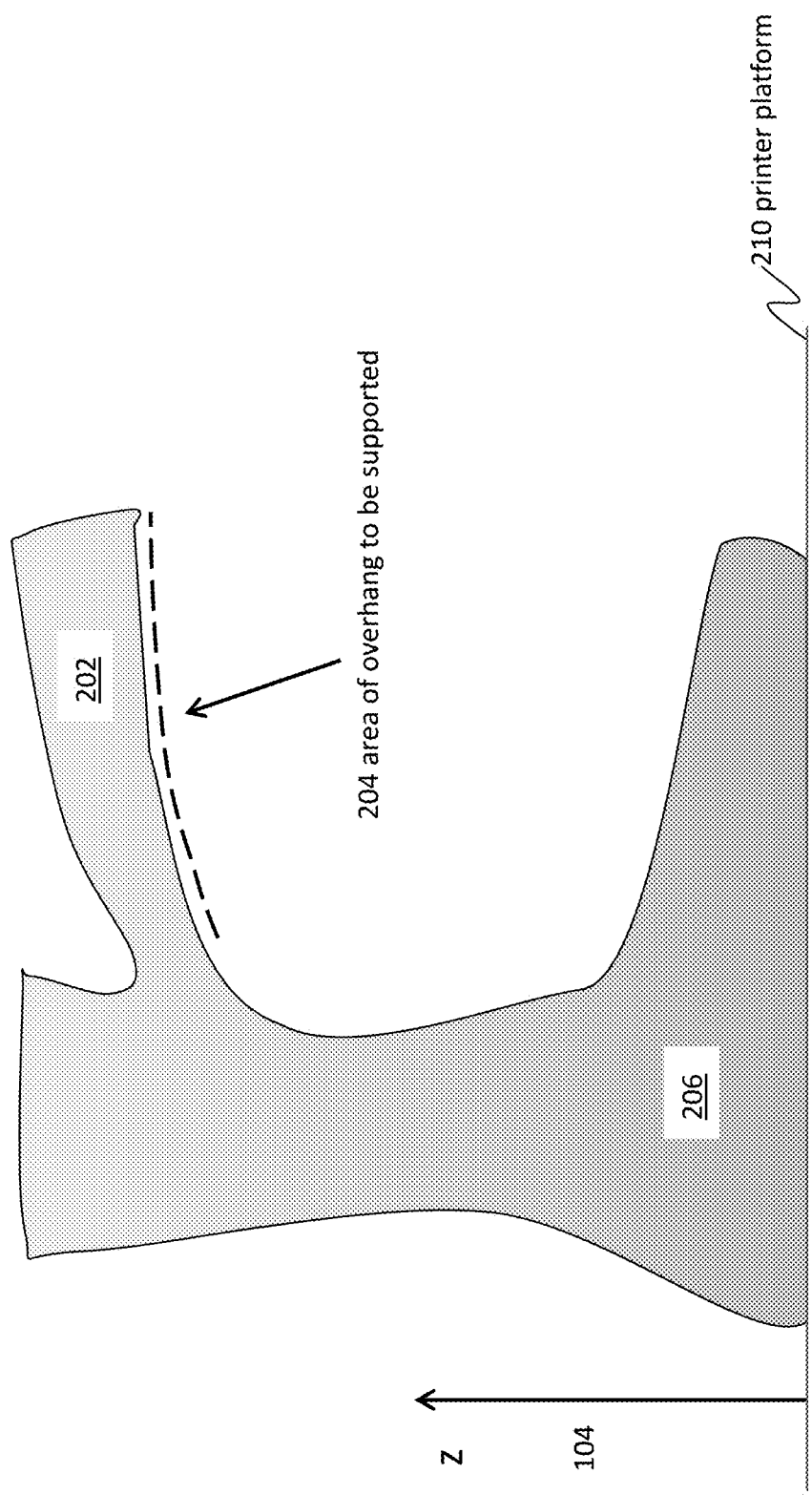
FIG. 2 depicts an area of a 3D model to be supported, in accordance with embodiments.

FIG. 2 depicts an exemplary 3D model 206 of an object with an overhanging shape (i.e., overhang 202). FIG. 2 is described with continued reference to the embodiment illustrated in FIG. 1. However, FIG. 2 is not limited to that embodiment. FIG. 2 shows how, due to the additive nature of 3D printing, 3D objects having overhangs such as the overhang 202 cannot be printed without a support element or structure. As shown, an area 204 of the overhang 202 needing support can be detected. In the example of FIG. 2, printing of a 3D object corresponding to the 3D model 206 upward in the print direction 104 can be modeled in order to detect the area 204 needing support. For example, printing of a first 2D layer of the 3D object is coincident with a printer platform 210. Printing of the 3D object can be simulated by modeling the addition of successive 2D layers on top of preceding 2D layers. The area 204 of the overhang 202 can be detected by incrementally adding such 2D layers in the print direction 104 whereby successive two-dimensional (2D) layers of the 3D object are relatively farther away from the printer platform 210 than preceding 2D layers.

One or more computing devices can be used to implement such modeling. The computing devices can also host a client application used to create, modify and print 3D models. For example, as described below with reference to FIGS. 10A, 10B and 11, a computing device configured to run any suitable graphics application, such as, but not limited to, Adobe® PhotoShop®, can be used to perform the modeling and definition of the adaptive support structures described herein. As described below with reference to FIG. 11, such a computing device can include a processor 1104. The processor 1104 may include a microprocessor, an application-specific integrated circuit (ASIC), a state machine, or other suitable processing device. The processor 1104 can include any number of computer processing devices, including one. The processor 1104 can be communicatively coupled to a computer-readable medium, such as memories 1108 and 1110 shown in FIG. 11. The processor 1104 can execute computer-executable program instructions and/or accesses information stored in the memories 1108 and 1110. The memories 1108 and 1110 can store instructions that, when executed by the processor 1104, cause the processor 1104 to perform operations described herein.

A computer-readable medium may include (but is not limited to) an electronic, optical, magnetic, or other storage device capable of providing a processor (see, e.g., the processor 1104 of FIG. 11) with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In some embodiments, one or more of the memories 1108 and 1110 can be implemented as firmware. As used herein, the term "firmware" is used to refer to one or more operating instructions for controlling one or more hardware components of a device. Firmware can include software embedded on a hardware device. A firmware module or program can communicate directly with a hardware component, such as the processor 1104 of the computing device 1100 shown in FIG. 11, without interacting with the hardware component via an operating system of the computing device.

Exemplary Method for Defining and Creating a Support Structure

Figure 3:
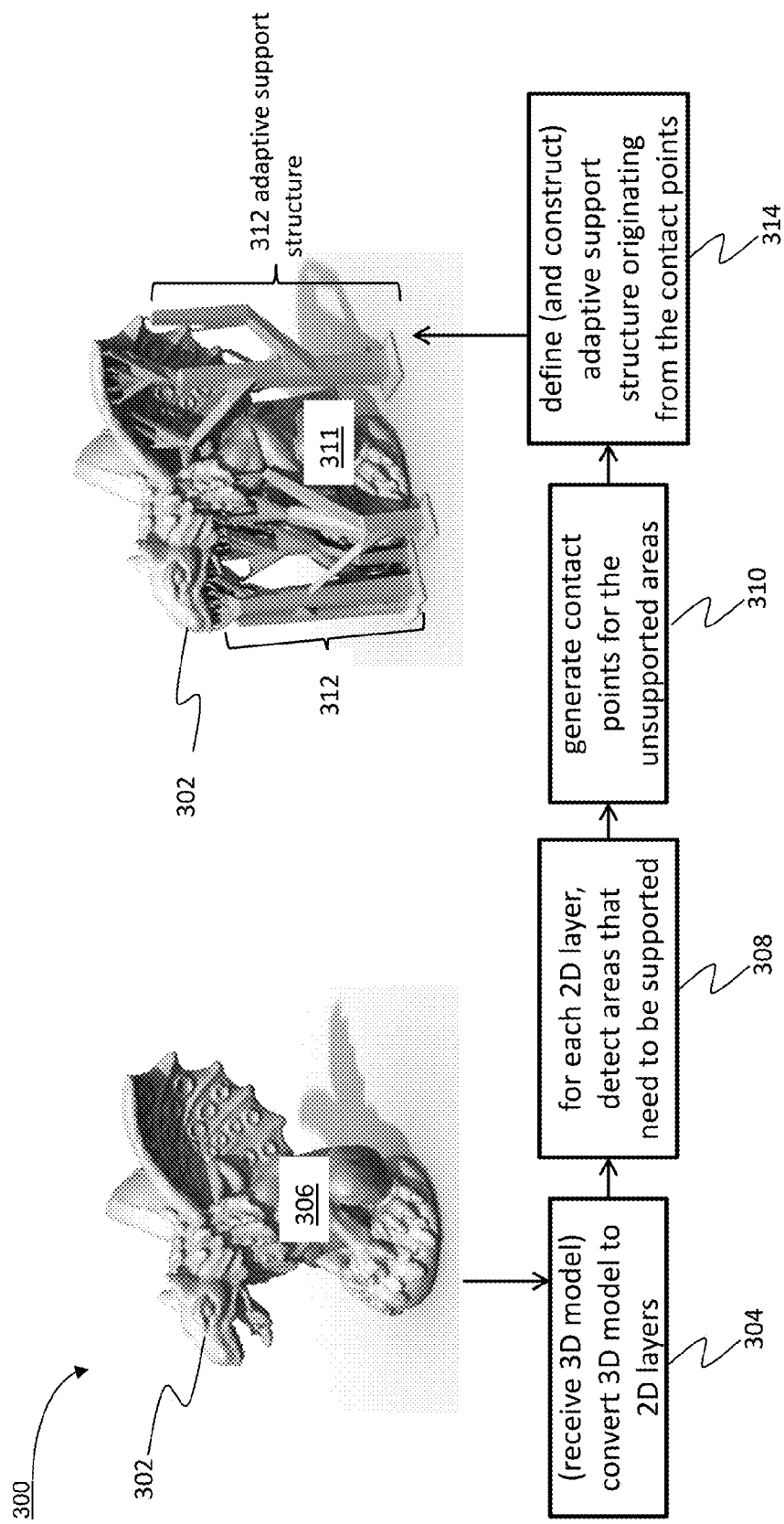
FIG. 3 is a flow chart illustrating an exemplary method for defining and creating adaptive supports structure for 3D models, in accordance with embodiments.

FIG. 3 is a flow chart illustrating an example method 300 for defining and creating an adaptive support structure. For illustrative purposes, the method 300 is described with reference to the embodiments illustrated in FIGS. 1 and 2. However, FIG. 3 is not limited to those embodiments and other implementations are possible. Optional portions of steps are indicated in the flowchart by parenthetical phrases (see, e.g., steps 304 and 314).

FIG. 3 illustrates an exemplary method 300 for defining an adaptive support structure, which can be a single level support structure having a single branch level. The method 300 can be performed on a computing device (see, e.g., computing device 1100 in FIG. 11) and can be implemented by a client application executing on the computing device.

The method 300 begins in step 304 where a 3D model 306 is converted into a 2D layer representation used in 3D printing (as described above with reference to FIG. 1). In the example of FIG. 3, a 3D model 306 having an overhang 302 is converted to a plurality of 2D layers by performing step 304. As shown, step 304 can optionally include receiving data representing the 3D model 306 as an input into the method 300. After the 3D model 306 has been converted to a plurality of 2D layers, control is passed to step 308.

In step 308, for each of the 2D layers resulting from the conversion in step 304, areas that need to be supported are detected. Step 308 can comprise analyzing the distance of all printed parts on a given 2D layer from printed parts on the previous 2D layer (i.e., the layer beneath the given 2D layer). In embodiments, an area of the overhang 302 needing support is detected in step 308 based upon a maximum allowed distance. For example, the maximum allowed distance can be a printer and material specific value provided as part of a printer profile of a 3D printer selected as an output device for the 3D model 306. Once all of the unsupported areas of the 3D model 306 are detected (i.e., areas on the overhang 302), control is passed to step 310.

In step 310, a set of contact points representing endpoints of virtual supports is generated. As seen in FIG. 3, step 310 can comprise generating such contact points for all unsupported areas detected in step 308. The contact points can be generated on the areas of the overhang 302 that are facing a printing platform, raft, scaffold, or pad (see, e.g., the area 204 facing the printer platform 210 in FIG. 2). In certain embodiments, the contact points generated in step 310 are distributed substantially uniformly across the areas detected in step 308. For example, the distance between two neighboring contact points may be based on a printer specific value provided in a printer profile. In such cases, each of the contact points generated in step 310 can be substantially the same, predetermined distance from neighboring contact points. That predetermined distance (i.e., spacing between contact points) can be based on properties indicated in a profile of a 3D printer selected as an output device for a printed 3D object 311 corresponding to the 3D model 306. After the contact points are generated, control is passed to step 314.

Next, in step 314, the contact points generated in step 310 are used as leaves of an adaptive tree support structure. Step 314 results in the adaptive support structure 312 being defined. As shown, the support structure 312 will include the contact points along with support elements extending below them from the overhang 302 to a plane or surface that the printed 3D object 311 is printed on. Such a plane can be, for example, the printer platform 210 shown in FIG. 2. Step 314 can optionally create the support structure 312 as part of the 3D printing process used to create the printed 3D object 311.

The method 300 can define and create a single level branching structure. In such a structure, a set of trunks are on one level and have branches that are all connected to contact points. In an embodiment, the support structure 312 built by the method 300 can be adapted as-needed to add additional levels to the branching structure. For example, subsequent iterations of the method 300 can be performed by reusing trunks defined in a prior iteration of step 314 as new virtual supports that can be connected by new connections. An exemplary method for building a support structure with additional branch levels (i.e., a multi-level support structure) is described below with reference to FIG. 5.

Exemplary Support Structure Elements

FIG. 4 illustrates exemplary elements of a support structure including connected virtual supports and contact points. In particular, FIG. 4 shows how virtual supports 414a-c can be connected to form a tree-like support structure 312. FIG. 4 is described with continued reference to the embodiments illustrated in FIGS. 1-3. However, FIG. 4 is not limited to those embodiments.

As shown in FIG. 4, the support structure 312 includes a plurality of contact points 410a-c. The contact points 410a-c can be generated, for example, by performing step 310 described above with reference to FIG. 3. In certain embodiments, the contact points 410a-c are generated such that they are distributed in a substantially uniform manner within an area to be supported, such as the area 204. For each of the contact points 410, there is a corresponding virtual support 414. For example, a first virtual support 414a extends downward from a first contact point 410a, a second virtual support 414b extends downward from a second contact point 410b, and a third virtual support 414c extends downward from a third contact point 410c.

After contact points 410a generated and a set of virtual supports 414 are created, connections 408 between the virtual supports 414 can be identified. As shown, when defining the support structure 312, respective connections 408a and 408b between pairs of virtual supports, 414a and 414b, and 414b and 414c, can be identified. In the example of FIG. 4, the first virtual support 414a is connected to the second virtual support 414b by connection 408a. Such a connection can be conceptualized as an incoming connection 408a to the virtual support 414b. Another pair of the virtual supports 414, e.g., virtual support 414b and the third virtual support 414c, can be connected by a second connection 408b. FIG. 4 depicts the result of identifying incoming connections 408a and 408b for the second support 414b. A technique for identifying such connections 408 is described below with reference to step 506 of FIG. 5.

In the embodiment provided in FIG. 4, the second virtual support 414b is considered to have a higher connectivity level than either of virtual supports 414a and 414c. This is because the virtual support 414b has two incoming connections, i.e., 408a and 408b. In comparison, the virtual support 414a has a single connection, connection 408a, and virtual support 414c also has one connection, namely connection 408b. In an embodiment, because the virtual support 414b has the maximal number of connections in the set of virtual supports 414a-c, the virtual support 414b may be selected as a trunk in the support structure 312. An embodiment defines a support structure to include a selected trunk, one or more virtual supports connected to the trunk, and incoming connections to the trunk from its connected virtual supports. For example, as described below with reference to step 514 in FIG. 5, the support structure 312 can be defined to include the trunk virtual support 414b, at least one virtual support connected to the trunk, i.e., virtual support 414a or virtual support 414c, and connections between the trunk and the at least one virtual support, i.e., connection 408a or 408b. In additional or alternative embodiments, the support structure 312 can be defined to exclude one or more virtual supports connected to the trunk. For example, since connection 408b extends to the contact point 410c, the support structure 312 can be defined such that virtual support 414c is not included (i.e., removed).

Exemplary Method for Defining a Multi-Level Support Structure

Figure 5:
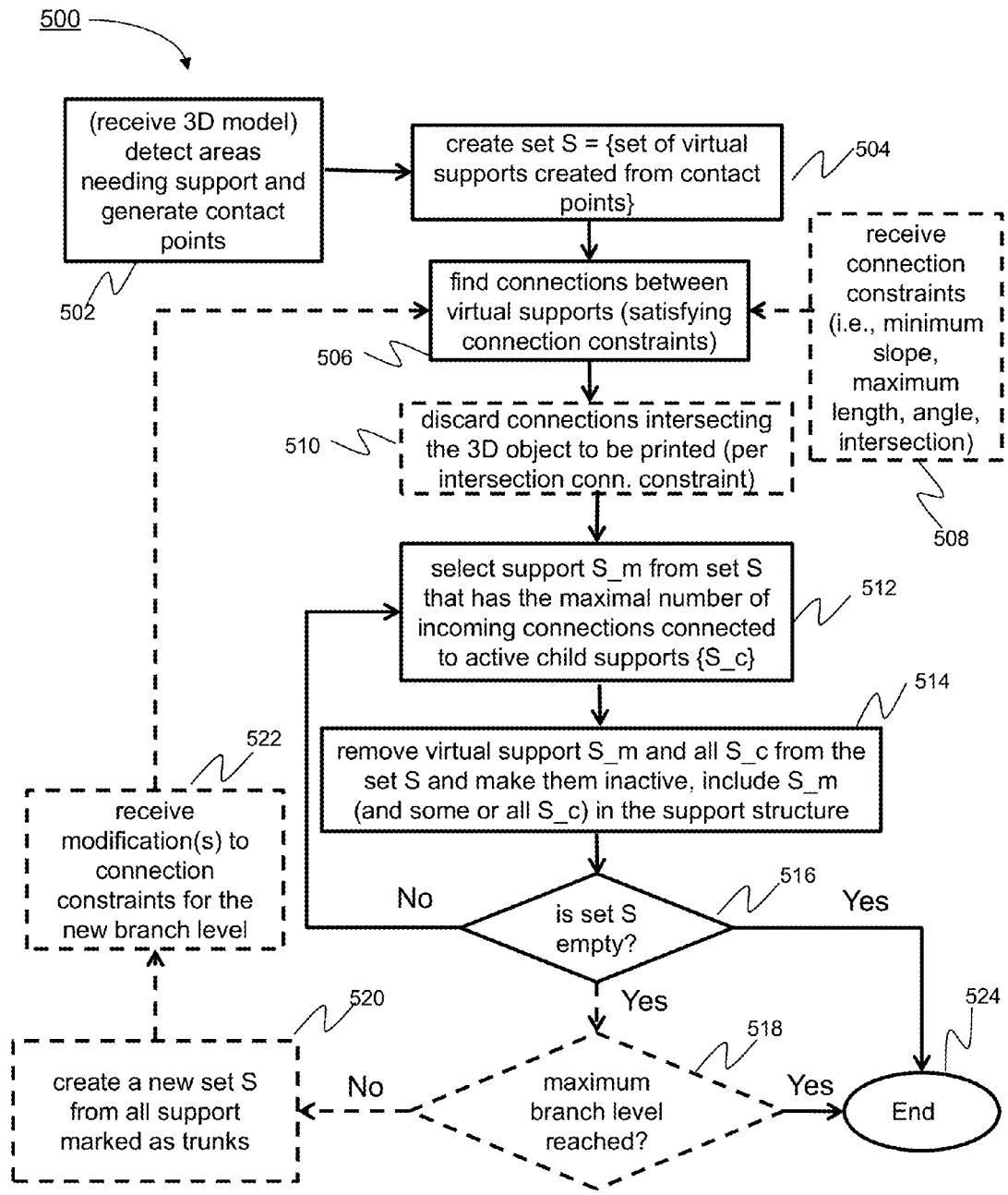
FIG. 5 is a flow chart illustrating an exemplary method for defining multi-level, adaptive support structures for 3D models, in accordance with embodiments.

FIG. 5 depicts a method 500 for defining an adaptive support structure. In particular, FIG. 5 depicts a flowchart with steps for defining an exemplary multi-level adaptive support structure having multiple branch levels. Such multi-level support structures can have trunks, and their corresponding branches, on two or more levels. For illustrative purposes, the method 500 is described with reference to the embodiments illustrated in FIGS. 1-4. However, other implementations of the method 500 are possible. Optional portions of steps are indicated in the flowchart by dashed lines and parenthetical phrases (see, e.g., steps 502, 506, 508, 510, 514, 518, 520, and 522).

The method begins in step 502, where areas in a 3D model needing support are detected and contact points are generated. In certain embodiments, step 502 can comprise performing operations similar to those described above with reference to steps 304, 308 and 310 of the method 300 shown in FIG. 3. As shown in FIG. 5, step 502 can optionally include receiving a 3D model before detecting the unsupported areas and generating the contact points. After the contact points are generated for the detected areas, control is passed to step 504.

Next, in step 504, a set S of virtual supports is created. A virtual support can be conceptualized as an abstract strut going downwards from a contact point towards a surface, such as a printer platform 210. By performing step 504, a set S including a plurality of virtual supports 414 can be created. In one embodiment, one virtual support is created for each contact point that was placed on the unsupported areas (see, e.g., virtual supports 414-a-c and their respective contact points 410 in FIG. 4). After the set S of virtual supports is created, control is passed to step 506.

Next, step 506 is performed to find possible connections between all virtual supports where the connections can be optionally constrained by user-defined values such as maximal connection length or minimal slope (see, e.g., the slopes of connections 408a, 408b in FIG. 4). As shown in FIG. 5, the method 500 can include optional step 508 in order to receive one or more connection constraints. In additional or alternative embodiments, at least one connection constraint, such as, for example, the intersection constraint described below, can be predefined or automatically set based upon parameters and properties of a printer profile. After the connections are identified in step 506, control is optionally passed to step 510 in cases where an intersection constraint is applicable. Otherwise, control is passed to step 512.

In optional step 510, connections found in step 506 are discarded if they intersect a 3D object to be printed. In accordance with an intersection constraint optionally received in step 508, step 510 can be performed to ensure that none of the connections intersect with the geometry of the input object by discarding all intersecting connections. After the intersection constraint is applied and any connections 408 not satisfying the constraint are removed, control is passed to step 512.

Next, in step 512, a virtual support in the set S, $S\_m$, is selected to be a trunk. In the non-limiting embodiment of FIG. 5, $S\_m$ is the virtual support 414 that has the highest number of incoming connections 408 connected to virtual supports $S\_c$, where $S\_c$ are active child supports in set S. Like $S\_m$, each of the child supports $S\_c$ are virtual supports 414 created in step 501. In one embodiment, the connection direction for connections 408 is from leaves toward the root, where leaves are locations such as contact points 410 that are higher, relative to a printer platform 210, than roots, which are a lower portion of a virtual support 414 selected to be a trunk. Exemplary trunks and roots are described in greater detail below with reference to FIGS. 6A and 6B. According to an embodiment, step 512 is performed by selecting a virtual support $S\_m$ in set S to be a trunk, wherein the selecting is based on comparing connectivity levels of the virtual supports 414 in set S. In this embodiment, the connectivity level of each of the virtual supports 414 in set S can be determined based on a number of connections 408 between the respective virtual support and other virtual supports in set S. In additional or alternative embodiments, step 514 can be performed by selecting a virtual support $S\_m$ having a number of connections exceeding a threshold as a trunk. Such a threshold can be based on one or more of a predetermined number, a median number of connections 408 for virtual supports 414 in set S, and an average number of connections 408 for virtual supports 414 in set S. After the trunk $S\_m$ is selected, control is passed to step 514.

Next, step 514 is performed to remove the selected trunk $S\_m$ and virtual supports $S\_c$ that are connected to $S\_m$ from the set of active supports S. As shown in FIG. 5, step 514 can include marking $S\_m$ and $S\_c$ as inactive so that they are not re-evaluated in a subsequent iteration of step 512. As further shown, step 514 can also comprise including trunk $S\_m$ and one or more of child supports $S\_c$ in an adaptive support structure being defined by the method 500. After the trunk $S\_m$ and its connected virtual supports $S\_c$ are removed from set S, control is passed to step 516.

In step 516, a determination is made as to whether the set S is empty or not. If it is determined that set S is empty, there are no more active virtual supports 414 to evaluate, and in one embodiment control is passed to step 524 where the method 500 ends. In an alternative embodiment, when set S is empty, control is optionally passed to step 518. Otherwise, if it determined that set S is not empty, control is passed to back to step 512. As seen in FIG. 5, steps 512 and 514 can be repeated until set S is empty.

In optional step 518, a determination is made as to whether a maximum branch level in the support structure has been reached or not. According to an embodiment, a maximum branch level for the support structure is a maximum number of levels of trunks to be included in the support structure. In one embodiment, the maximum branch level evaluated in step 518 can be received as input or a parameter. If it is determined that the maximum branch level has been reached, control is passed to step 524 where the method 500 ends. Otherwise, control is passed to step 520.

In optional step 520, a new set S of virtual supports is created from virtual supports 414 that have been marked as trunks by prior iterations of step 512. The new set S represents a second set of virtual supports whose members have all been selected to be trunks. After the second set is created, control is passed to step 522.

In optional step 522, a modification to one or more connection constraints is received before passing control back to step 506. As shown, the modified connection constraints will then be applied to the new branch level to be created in the support structure by repeating steps 506-516 using the new set S. According to an embodiment, the modified connection constraints received in step 522 and unmodified connection constraints received in step 508 are used in step 506 to create connections 408 between virtual supports 414 in the new branch level being created a multi-level support structure 312. One example of a multi-level support structure 312 having two branch levels is described below with reference to FIG. 6B.

Exemplary Support Structures

Figure 6A:
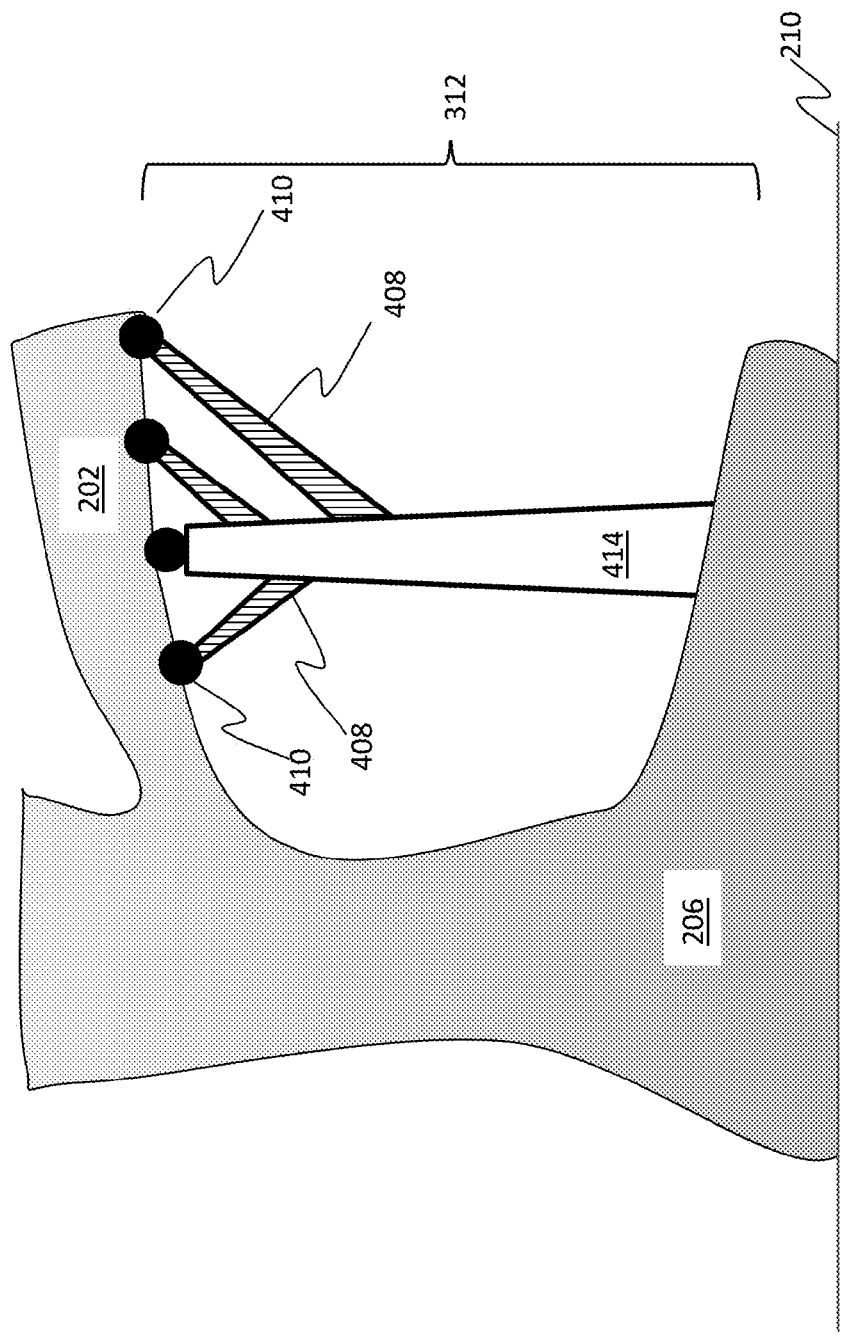
FIGS. 6A and 6B depict exemplary support structures, in accordance with embodiments.
Figure 6B:
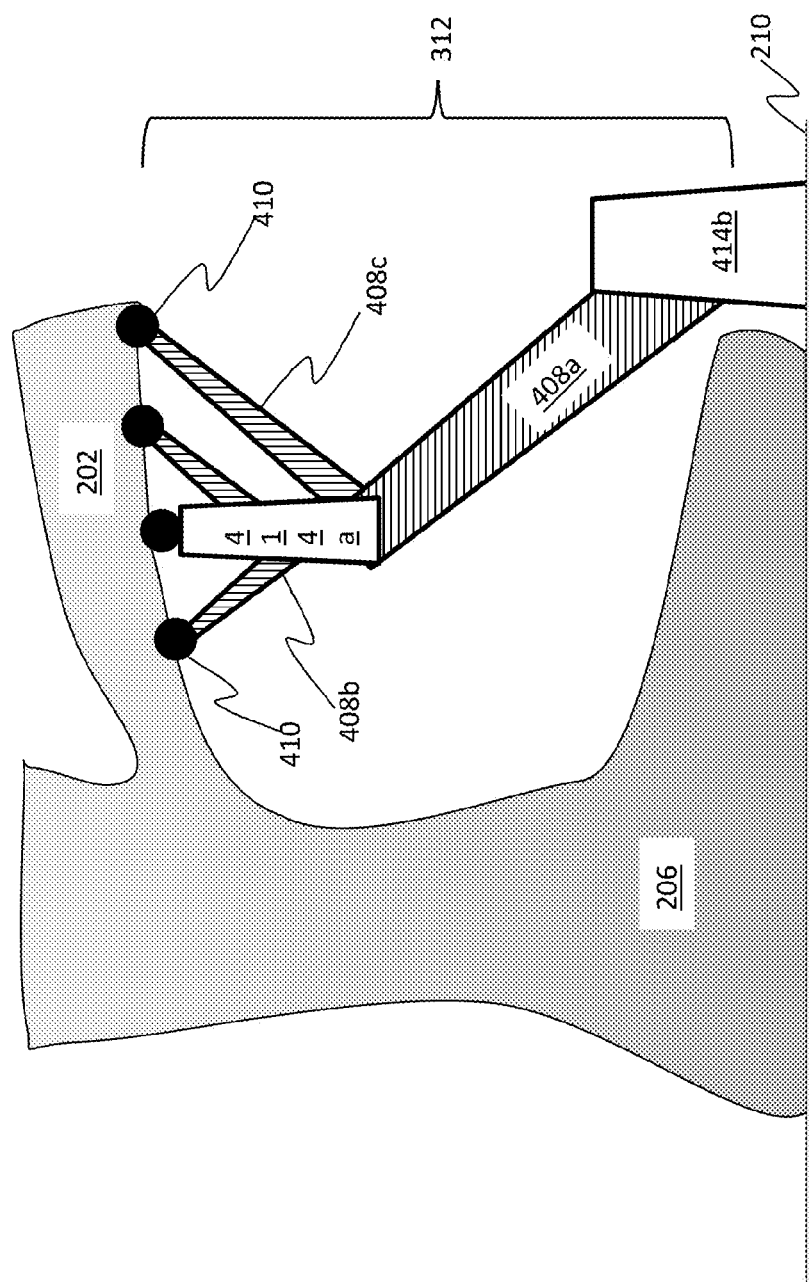

FIGS. 6A and 6B depict exemplary adaptive support structures. FIGS. 6A and 6B are described with continued reference to the embodiments illustrated in FIGS. 1-5. However, FIGS. 6A and 6B are not limited to those embodiments. It is to be understood that although the exemplary support structures 312 shown in FIGS. 3, 4, 6A, 6B and 8-10 are not identical, as they depict adaptive support structures whose configurations and designs can be dynamically re-defined or adjusted (i.e., adapted), they are collectively referred to herein and labeled in the drawings as adaptive support structures 312. Similarly, while the exemplary virtual supports 414, contact points 410 and connections 408 illustrated in FIGS. 4, 6A, 6B and 8-10 may differ, it is to be understood that variances in the dimensions and arrangements of such elements are examples of how elements within adaptive support structures 312 can be reconfigured as needed.

The exemplary support structure 312 shown in FIG. 6A is configured as a single level structure having a single level of branches whereby all connections 408 extend from a trunk on a single level. That is, the branch level, or number of levels of branches, in the support structure 312 depicted in FIG. 6A is one. In FIG. 6A, the virtual support 414 selected as a trunk is the only trunk in the support structure 312. In additional or alternative embodiments, a single level support structure can include multiple trunks. In either case, such single level support structures are so-called because all trunks (i.e., virtual support 414) and branches (i.e., connections 408) are on a single level. With single level support structures, all connections 408 extending to contact points 410 are also the same, single branch level.

FIG. 6A shows how the root support of a tree-like support structure 312 might end up being connected to a 3D model 206, which can damage the model's surface. To avoid this, an embodiment shown in FIG. 6B automatically places a new virtual support 414b outside of the 3D model 206, which effectively reduces the unwanted contact with the printed object corresponding to the 3D model 206.

In particular, FIG. 6A shows how a virtual support 414 selected as a trunk, if fully extended downward with respect to the contact points 410, can intersect with a portion of the 3D model 206. For example, the methods 300 and 500 described above with reference to FIGS. 3 and 5, respectively, can create trees of supports, such as the support structure 312 shown in FIG. 6A, that are connected to the contact points 410 at the end of leaf branches (i.e., at the distal ends of connections 408). The positions of roots of these trees are located below a contact point 410 because the support structure 312 is constructed from virtual supports 414 that are built by extending downward from respective contact points 410. As shown in FIG. 6A, such roots are the lowermost portion of a virtual support 414 that has been selected to be a trunk. That is, the portion of virtual support 414 in FIG. 6A that is closest to the printer platform 210 is a root. As seen in FIG. 6A, in some cases, roots of certain support structures 312 might end up being connected to a 3D model 206. If a corresponding 3D object were to be printed with the support structure 312 as configured in FIG. 6A, such a support structure may be more difficult to remove from the 3D object and may degrade the quality of the finished, printed 3D object. According to embodiments, prior to printing the 3D model 206, the single level adaptive support structure 312 shown in FIG. 6A can be adjusted to be a multi-level support structure, such as the adaptive support structure described below with reference to FIG. 6B.

FIG. 6B illustrates how the adaptive support structure 312 can be altered to avoid having a root portion of any of the structure's trunks (i.e., virtual supports 414a, 414b) intersect with the 3D model 206. FIG. 6B shows how embodiments can place a virtual support 414a in the empty space around the 3D model 206, which allows creation of the connection 408a that move the root portion of virtual support 414b outside of the footprint of the 3D model 206. For example, FIG. 6B shows how a first virtual support 414a at a first level is not extended downward to the 3D model 206. Instead, the adaptive support structure 312 in FIG. 6B has been defined such that a second virtual support 414b is placed on the printer platform 210 without intersecting with the 3D model 206. The support structure 312 in FIG. 6B includes a first connection 408a between virtual supports 414a and 414b so that virtual support 414b is not in empty space. The first connection 408a is at a first branch level of the support structure 312. The support structure 312 includes further connections 408b, 408c at a second, higher branch level. At this second branch level, the connections 408b, 408c connect the virtual support 414a to the contact points 410 on the overhang 202. In embodiments, a branch level can be predefined, received as input, and/or a tunable constraint used to restrict the number of levels of trunks to be included in a support structure 312.

With continued reference to the embodiments of FIGS. 5 and 6B, when step 518 determines that a maximum branch level has not been reached, an additional determination can be made. The additional determination can determine if fully extending a trunk in the support structure 312, such as virtual support 414a, downward towards the printer platform 210, will cause the virtual support 414a to intersect with the 3D model 206. If such an intersection is possible, the virtual support 414a can be partially extended downward, with respect to the contact points 410, so that it does not intersect with the 3D model 206. Then, a second set of virtual supports can be used, each virtual support 414 in the second set having been selected to be a trunk. At this point, the support structure 312 can be adapted to include another trunk, such as the virtual support 414b, at least one virtual support 414a connected to the virtual support 414b, and a connection 408a between the virtual supports 414a and 414b. At this point, embodiments can extend the virtual support 414b downward, with respect to the contact points 410, towards the printer platform 210.

Exemplary Techniques for Determining Support Element Dimensions

Figure 7:
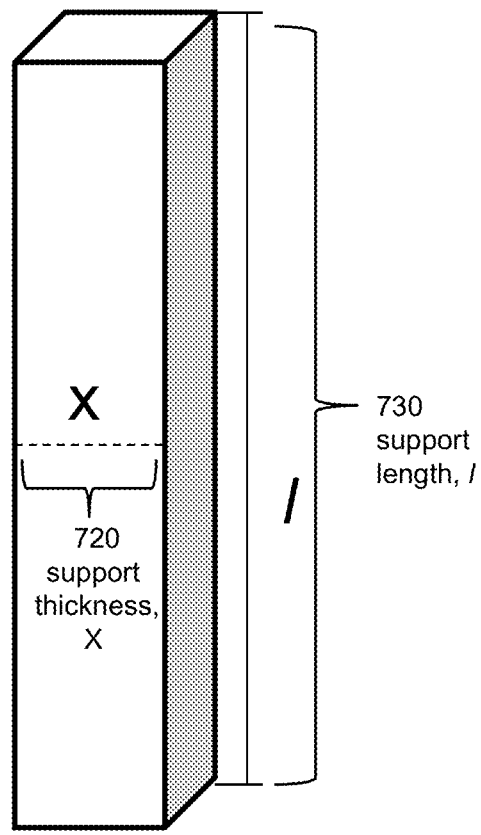
FIG. 7 depicts dimension properties of an exemplary support.

FIG. 7 shows how support elements, such as virtual supports 414 and connections 408, are defined by their thickness 720 ("x") and by their length 730 (i.e., "l"). Embodiments ensure that support elements print correctly and that they do not break during the printing process. This can be accomplished, for example, by automatically calculating the thickness 720 of individual supports in an adaptive tree-like support structure 312 so that resulting structure is structurally sound. The automatic calculations can include the equations described in the following paragraphs.

When a user wishes to create a 3D object corresponding to a given 3D model, support structures, such as the exemplary adaptive support structures 312 described herein, need to be created (i.e., printed) by and output device. The output device can be, for example, a 3D printer. When printed, the adaptive support structures 312 are subject to physical forces caused by the printing process. For example, in case of FDM printing, the movement of the printer head causes horizontal bending forces that can cause stress and deflection of support elements, which can lead to a failed print. Due to the nature of certain printed material, problems may be caused by the deflection of the supports. Such deflection can cause print materials, such as a plastic, to be deposited in wrong locations.

The deflection d at the end of a support element can be computed as:

$$d=(W*l^3)/(3*E*S)$$

where W is the load at the end of the support, l is the length of the support (see, e.g., support length 730 shown in FIG. 7), E is the modulus of elasticity of the printed material and S is the moment of inertia that depends on the shape of the cross-section of the support. For a support element with a square cross-section, the moment of inertia $S=k*x^4$, where k is a constant and x is the length of a cross-section edge (see, e.g., support width 720 in FIG. 7). An embodiment keeps the deflection below some maximal threshold value d_c that is determined experimentally for a given output device and print material. In order to ensure that the deflection stays below the critical value d_c, an embodiment ensures that the maximal thickness of the support x_m is:

$$x\_m^4=l^3*(W/(3*E*k*d\_c))$$

Since an embodiment assumes that the term (W/(3*E*k*d_c))=c is constant, the above equation can be rewritten as:

$$x\_m=l^{(3/4)}*c^{(1/4)}$$

After calculation a maximal size of a support element using the above equations, such a maximal size can be used as a constraint during the construction of a tree-like support structure 312 to ensure that the virtual supports 414 and connections 408 are going to be printed safely and that they are not going to intersect the printed object.

Exemplary Adaptive Support Structures

Figure 8:
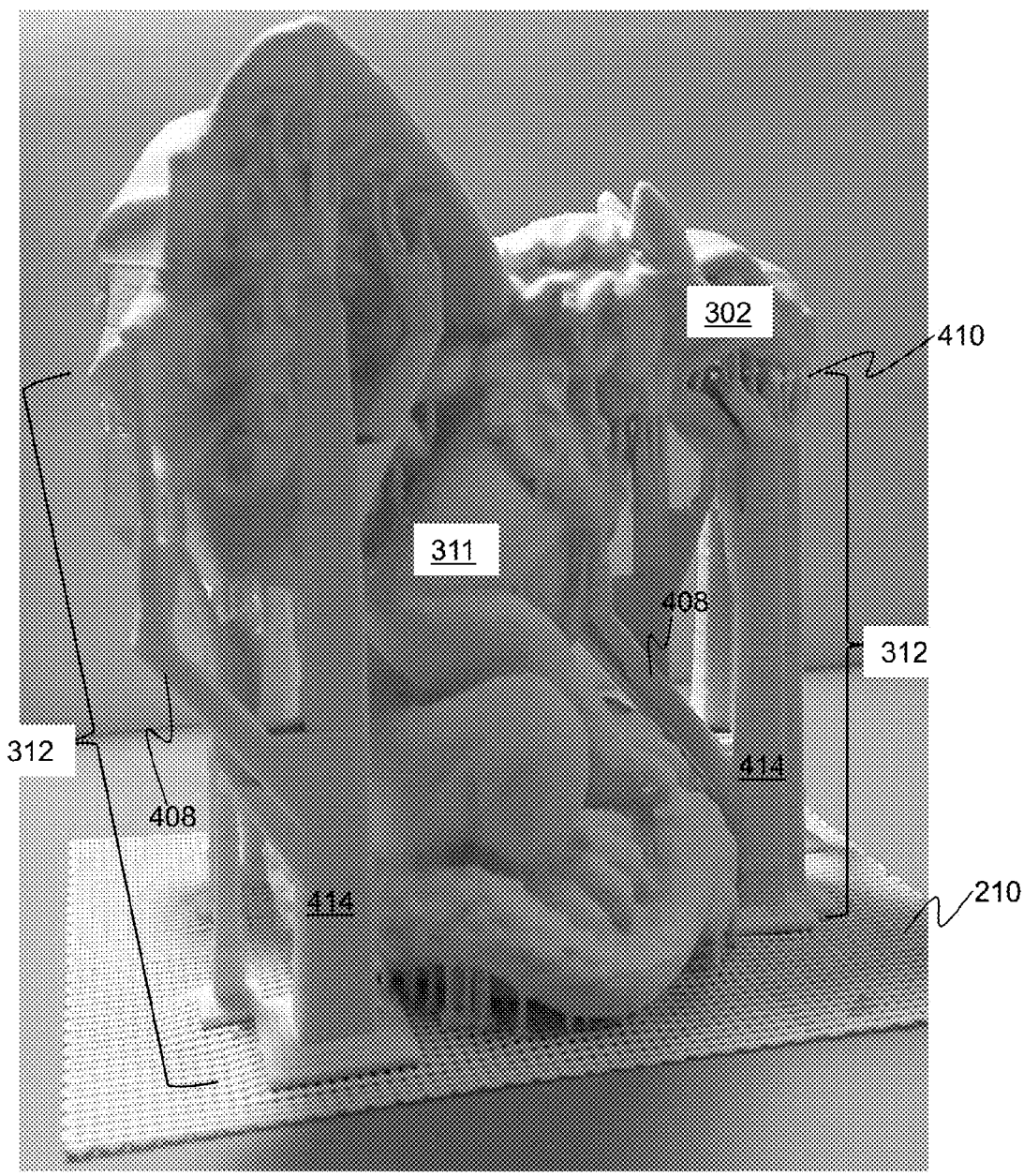
FIGS. 8 and 9 illustrate exemplary adaptive support structures constructed for 3D objects.
Figure 9:
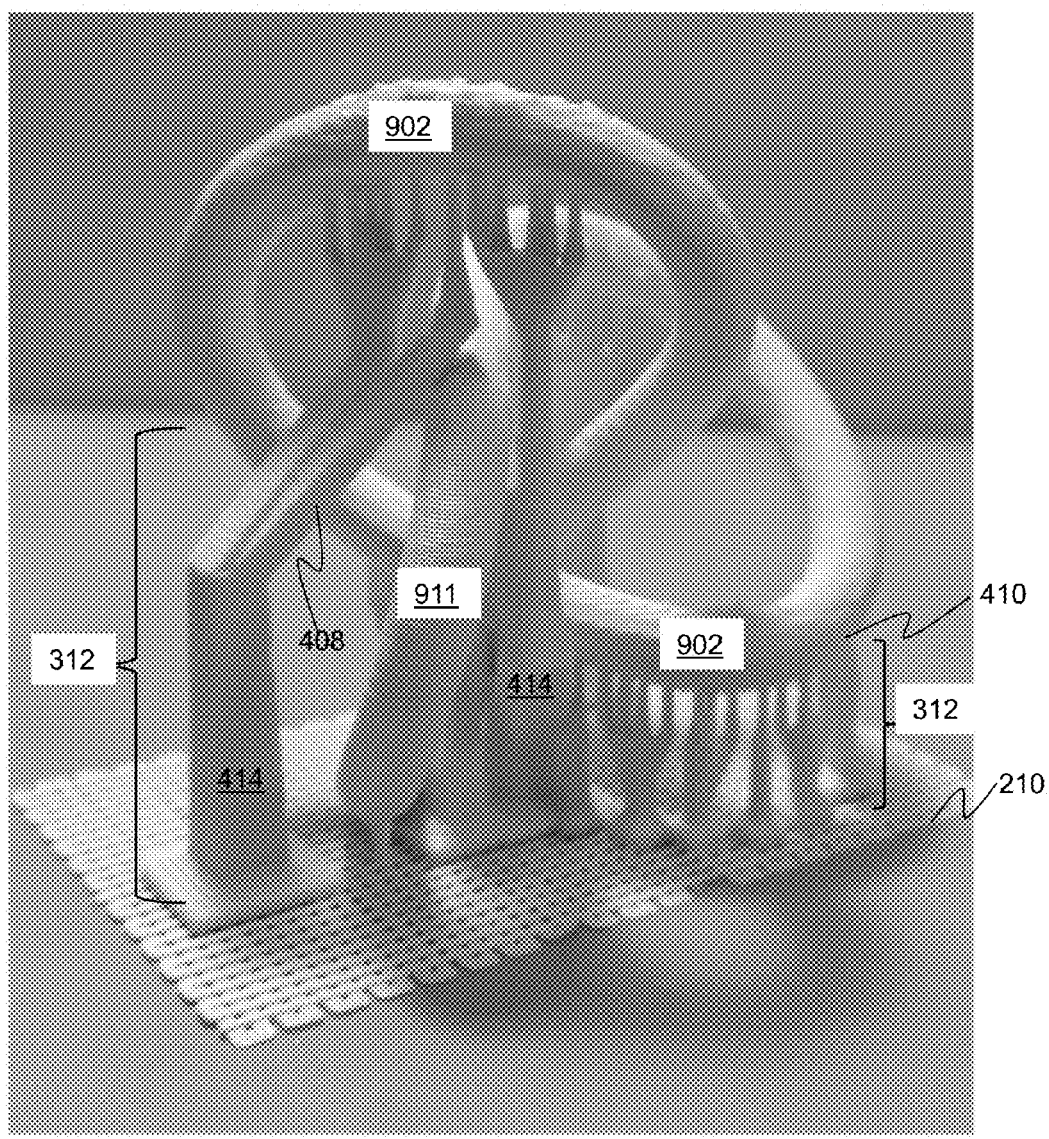

FIGS. 8 and 9 depict exemplary printed results for 3D objects 311 and 911 using respective adaptive support structures 312. In particular, FIG. 8 shows how an overhang 302 of a printed 3D object 311 is supported by a support structure 312 including contact points 410, supports 414 (no longer 'virtual' in the examples of FIGS. 8 and 9), and connections 408. The supports 414 extend downward from the contact points 410 towards the printer platform 210. FIG. 9 depicts another example of a printed 3D object 911 and its corresponding adaptive support structures 312 supporting overhangs 902.

Exemplary User Interface

Figure 10A:
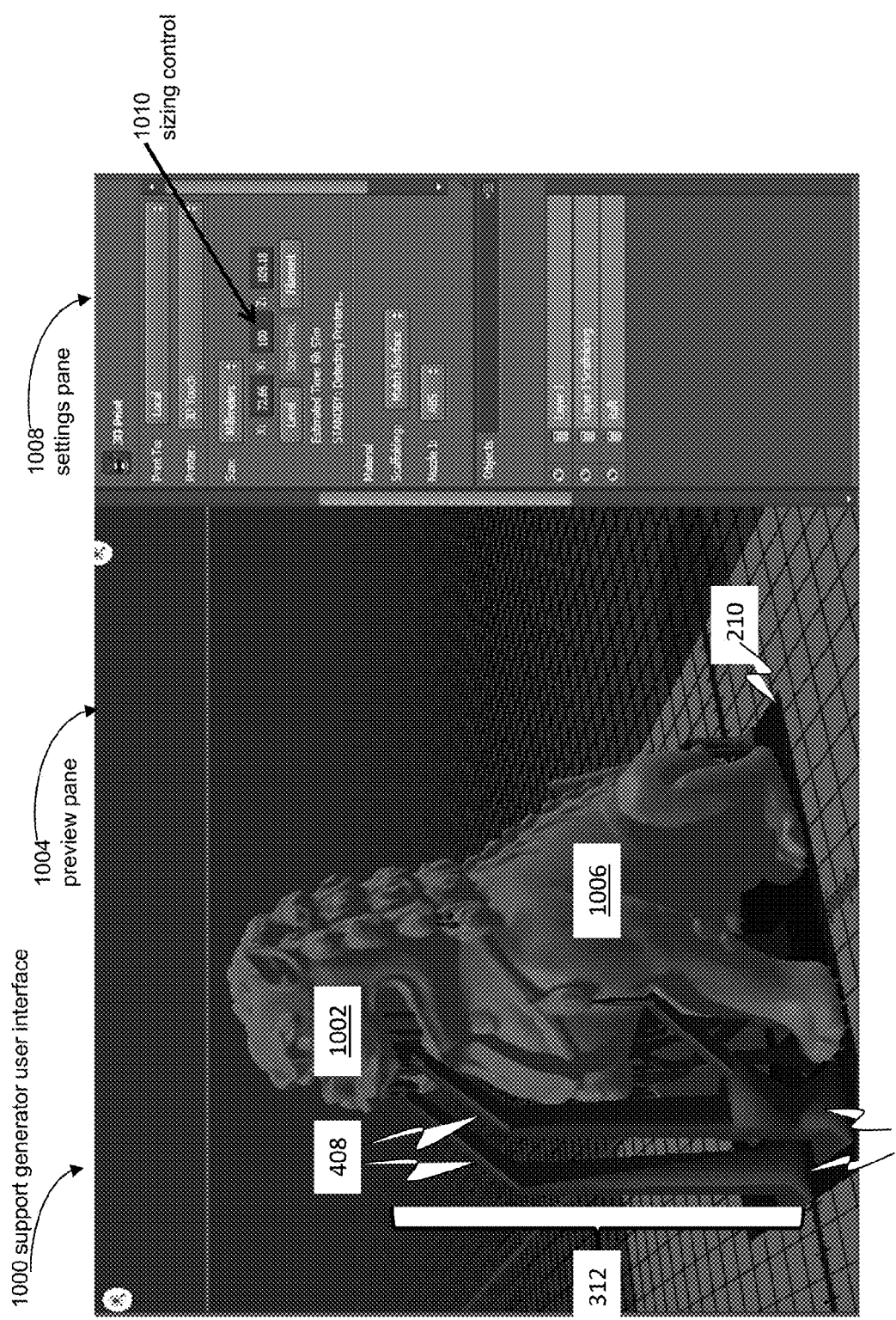
FIGS. 10A and 10B illustrate an example user interface for generating, previewing, and modifying support structures, in accordance with embodiments.
Figure 10B:
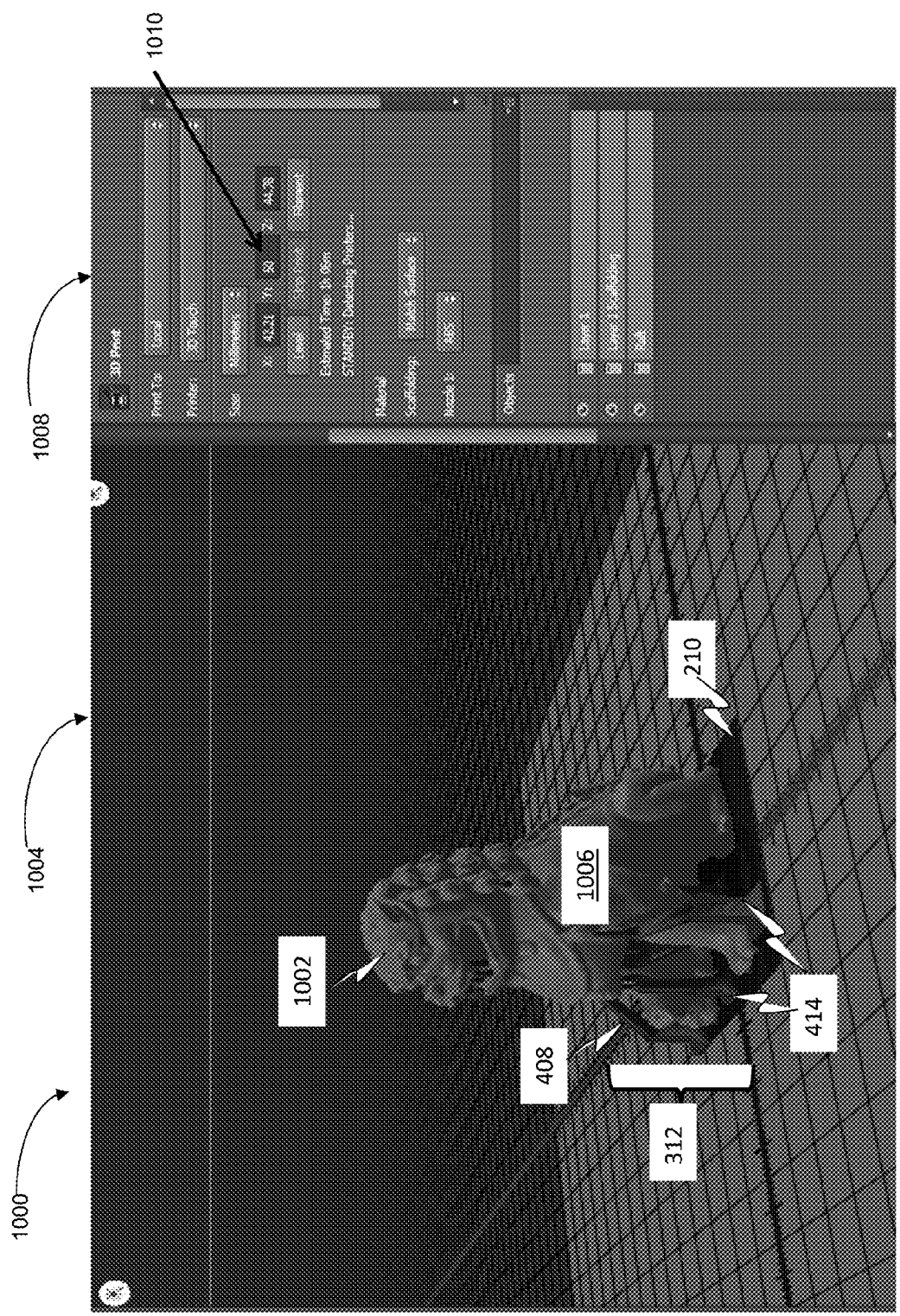

FIGS. 10A and 10B show one example of a user interface (UI), depicted herein as user interface 1000, according to certain embodiments of the present disclosure. The UI 1000 depicted in FIGS. 10A and 10B is described with reference to the embodiments of FIGS. 2-4. The UI 1000 is an exemplary UI for a support generator. As shown, supports can be automatically recreated when a selected output size for a 3D model 1006 changes. The UI 1000 can be rendered on the display 1130 of the computing device/system 1100 described below with reference to FIG. 11. In embodiments, a user operating a computing device may interact with interface 1000 to generate and preview a support structure. For example, a user may use the UI 1000 in a graphics application supporting 3D printing, such as, for example, Adobe® Photoshop®. In FIGS. 10A and 10B, displays are shown with various icons, command regions, windows, toolbars, menus, scroll bars, and buttons that are used to initiate action, invoke routines, generate support structures, alter 3D models, preview 3D objects, or invoke other functionality. The initiated actions include, but are not limited to, selecting an output device (i.e., a 3D printer), selecting output/printing parameters, selecting a scaffolding material, selecting one or more printing materials, selecting print nozzles, and altering properties of a 3D model. Certain parameters can depend upon the properties of the selected output device. For example, if a selected 3D printer has a nozzle of a certain diameter and a certain output material (e.g., acrylonitrile butadiene styrene (ABS) plastic in the example of FIGS. 10A and 10B); adaptive support structures can be designed in order to take such properties into consideration. For brevity, only the differences occurring within the figures, as compared to previous or subsequent ones of the figures, are described below.

In the example shown in FIGS. 10A and 10B, the UI 1000 depicts a preview pane 1004 and a settings pane 1008 to configure certain features of the 3D model 1006 and its support structure 312. The settings pane 1008 includes a list of features and properties of the 3D model 306 and an output device (i.e., a selected 3D printer) that may each be selected for configuration. For example, the list of features in the settings pane 1008 includes sizing controls 1010 and/or other settings for configuring output of the 3D model 1006.

In the example embodiment shown in FIGS. 10A and 10B, a sizing control 1010 can be selected and used to change a value (i.e., a scaling factor or dimension) that corresponds to the size of a 3D object to be created from the 3D model 1006. As shown, when a sizing control 1010 is used to change dimensions of the 3D model 1006, the resized model, including its resized overhang 1002, and changes to the corresponding support structure 312 are presented in the preview pane 1004. As seen in FIG. 10B, when the X, Y, and Z dimensions of the 3D model 1006 are reduced, a preview of the smaller version of the 3D model 1006 is rendered in the preview pane 1004. In additional or alternative embodiments, changes to the support structure 312 resulting from the resized 3D model 1006 are also rendered in the preview pane 1004.

Exemplary Computer System Implementation

Figure 11:
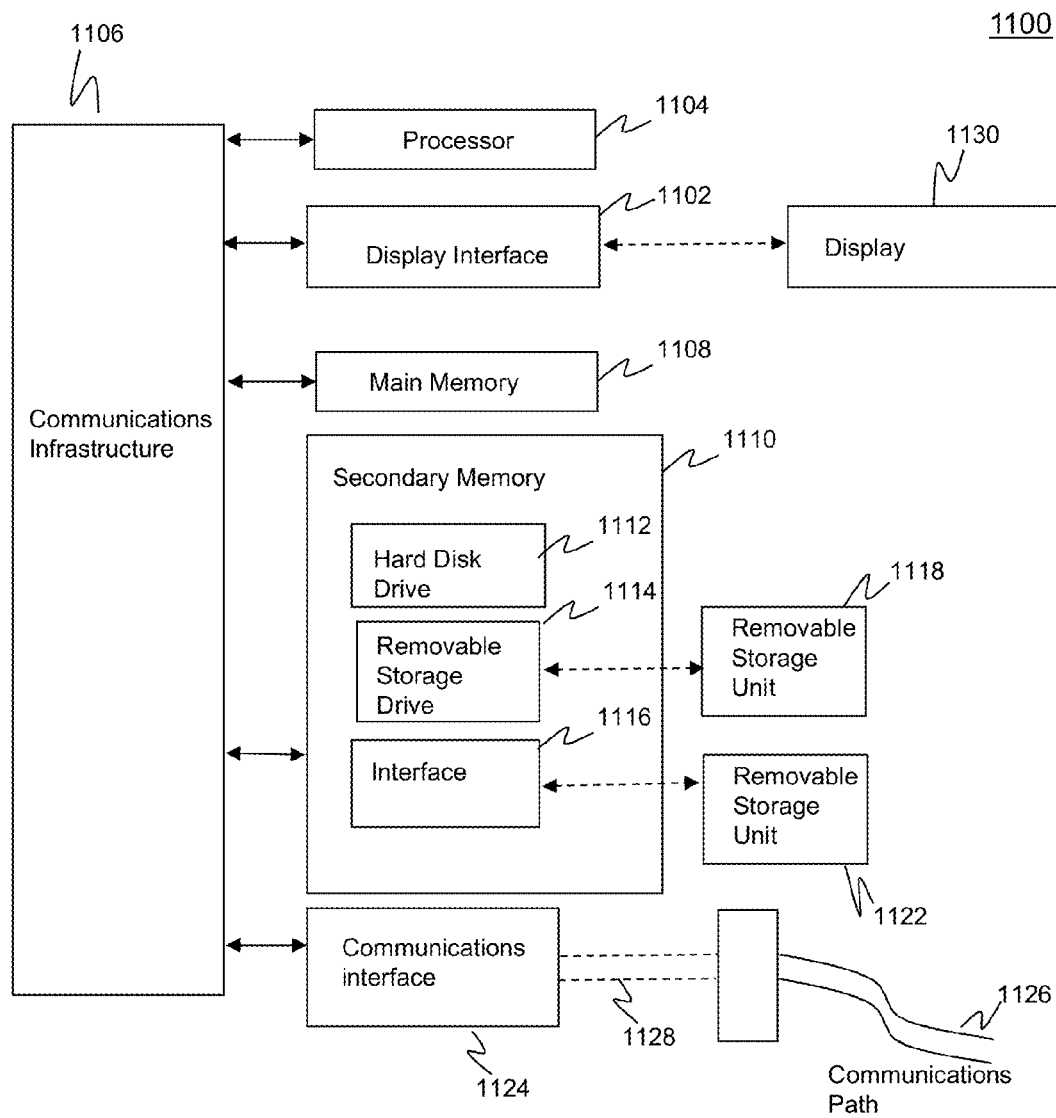
FIG. 11 is a diagram of an exemplary computer system in which embodiments of the present disclosure can be implemented.

Although exemplary embodiments have been described in terms of systems and methods, it is contemplated that certain functionality described herein may be implemented in software on microprocessors, such as the processor included in computing devices such as the computer system 1100 illustrated in FIG. 11. In various embodiments, one or more of the functions of the various components may be implemented in software that controls a computing device, such as computer system 1100, which is described below with reference to FIG. 11.

Aspects of the present invention shown in FIGS. 1-10, or any part(s) or function(s) thereof, may be implemented using hardware, software modules, firmware, tangible computer readable media having logic or instructions stored thereon, or a combination thereof and may be implemented in one or more computer systems or other processing systems.

FIG. 11 illustrates an example computer system 1100 in which embodiments of the present invention, or portions thereof, may be implemented as computer-readable instructions or code. For example, some functionality performed by a computing device executing an application having the UI 1000 shown in FIGS. 10A and 10B, can be implemented in the computer system 1100 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 300 and 500 illustrated by the flowcharts of FIGS. 3 and 5 discussed above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1104 may be a special purpose or a general purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like.

The removable storage drive 1114 reads from and/or writes to a removable storage unit 1118 in a well known manner. Removable storage unit 1118 may comprise a floppy disk, magnetic tape, optical disk, etc. which is read by and written to by removable storage drive 1114. As will be appreciated by persons skilled in the relevant art, removable storage unit 1118 includes a non-transitory computer readable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or EEPROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

As used herein the terms "computer readable medium" and "non-transitory computer readable medium" are used to generally refer to media such as memories, such as main memory 1108 and secondary memory 1110, which can be memory semiconductors (e.g., DRAMs, etc.). Computer readable medium and non-transitory computer readable medium can also refer to removable storage unit 1118, removable storage unit 1122, and a hard disk installed in hard disk drive 1112. Signals carried over communications path 1126 can also embody the logic described herein. These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the steps in the method 1100 illustrated by the flowchart of FIG. 11, discussed above. Accordingly, such computer programs represent controllers of the computer system 1100. Where the invention is implemented using software, the software may be stored in a computer program product and loaded into computer system 1100 using removable storage drive 1114, interface 1120, and hard disk drive 1112, or communications interface 1124.

In an embodiment, a display device used to display the UI 1000 shown in FIGS. 10A and 10B may be a computer display 1130 shown in FIG. 11. The computer display 1130 of computer system 1100 can be implemented as a touch sensitive display (i.e., a touch screen). Similarly, the user interfaces shown in FIGS. 10A and 10B may be embodied as a display interface 1102 shown in FIG. 11.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
    detecting, by a computing device, at least one area of a three dimensional (3D) model that needs to be supported in a 3D printing of the 3D model;
    generating, by the computing device, contact points for the at least one area by distributing the contact points across the at least one area, wherein distances between neighboring contact points are based at least in part on properties of an output device configured to create a 3D object corresponding to the 3D model, the output device properties including one or more of a nozzle diameter range and maximum output dimensions;
    creating a set of virtual supports, each virtual support in the set extending downward from a respective one of the contact points;
    identifying connections between the virtual supports in the set, the connections satisfying one or more connection constraints including one or more of a maximum connection length, a minimum connection slope, a connection angle constraint with respect to one of the virtual supports or the surface, and an intersection constraint restricting connections determined to intersect with the 3D model;
    selecting a virtual support in the set to be a trunk, the selecting based on comparing connectivity levels of the virtual supports in the set, the connectivity level of each of the virtual supports in the set determined based on a number of the connections between the respective virtual support and other virtual supports in the set;
    defining a support structure originating from the contact points and extending downward towards a surface, wherein the support structure includes the trunk, at least one virtual support connected to the trunk, and connections between the trunk and the at least one virtual support; and
    sending parameters for creating the 3D object to the output device so that an operation of the output device is controlled based on the parameters, the parameters including the support structure and one or more of a scaling factor, a layer height a scaffolding material, and a printing material.

2. The method of claim 1, wherein the selecting comprises selecting a virtual support having a number of connections exceeding a threshold as the trunk, the threshold being based on one or more of a predetermined number, a median number of connections for virtual supports in the set, and an average number of connections for virtual supports in the set.

3. The method of claim 1, wherein the creating comprises creating a virtual support for each of the contact points.

4. The method of claim 1, further comprising selecting additional trunks by:
    removing the trunk and the at least one virtual support connected to the trunk from the set; and
    repeating the identifying, the selecting, and the removing to select the additional trunks until the set is empty.

5. The method of claim 1, further comprising:
    removing the trunk and the at least one virtual support connected to the trunk from the set;
    repeating the identifying, the selecting, and the removing to select the additional trunks until the set is empty;
    receiving a maximum branch level for the support structure, the maximum branch level defining a maximum number of levels of trunks to be included in the support structure;
    in response to determining that a trunk in the support structure, if fully extended downward towards the surface, will intersect with the 3D model and that a number of levels of trunks included in the support structure is less than the maximum branch level:
        partially extending the trunk downward, with respect to the contact points, so that it does not intersect with the 3D model;
        creating a second set of virtual supports, each virtual support in the second set having been selected to be a trunk;
        repeating, using the second set, the identifying;
        repeating, using the second set, the selecting to select another trunk;
        modifying the support structure to include the another trunk, at least one virtual support connected to the another trunk, and connections between the another trunk and the at least one virtual support; and
        extending the another trunk downward, with respect to the contact points, towards the surface.

6. The method of claim 1, further comprising:
    removing the trunk and the at least one virtual support connected to the trunk from the set;
    repeating the identifying, the selecting, and the removing to select the additional trunks until the set is empty;
    receiving a maximum branch level for the support structure, the maximum branch level defining a maximum number of levels of trunks to be included in the support structure;
    in response to determining that a number of trunks included in the support structure is less than the maximum branch level, creating a second set of virtual supports, each virtual support in the second set having been selected to be a trunk; and in response to receiving a modification to at least one of the one or more connection constraints:
repeating, using the second set, the identifying;
repeating, using the second set, the selecting to select another trunk;
modifying the support structure to include the another trunk, at least one virtual support connected to the another trunk, and connections between the another trunk and the at least one virtual support; and
extending the another trunk downward, with respect to the contact points, towards the surface.

7. The method of claim 1, further comprising:
removing the trunk and the at least one virtual support connected to the trunk from the set;
repeating the identifying, the selecting, and the removing to select the additional trunks until the set is empty;
in response to determining that a number of levels of trunks in the support structure is less than a maximum branch level;
removing the another trunk and the at least one virtual support connected to the another trunk from the second set;
repeating the identifying, the selecting, the removing, and the modifying until the number of levels of trunks included in the support structure equals the maximum branch level or the second set is empty.

8. The method of claim 1, wherein the detecting comprises:
converting the 3D model into a plurality of two dimensional (2D) layers extending upward from a plane, wherein a first one of the 2D layers is coincident with the plane and each successive one of the 2D layers is above one or more preceding 2D layers;
detecting that a portion of a 2D layer needs to be supported in response to determining that the greater of a distance between the portion and the surface and a distance between the portion and a preceding 2D layer exceeds a maximum distance, the maximum distance being based on properties of an output device and an output material selected to create a 3D object corresponding to the 3D model,
wherein the generating comprises generating the contact points in detected portions of the 2D layers.

9. The method of claim 1, wherein the surface is below the contact points and coincident with a print pad, a print raft, a scaffold, a printer platform, or a print surface of a 3D printer selected to create a 3D object corresponding to the 3D model.

10. The method of claim 1, wherein the one or more connection constraints prevent identification of connections that are perpendicular to a virtual support or parallel to the surface.

11. The method of claim 1, wherein the intersection constraint prevents identification of a connection:
intersecting with any portion of the 3D model; and
intersecting with more than two virtual supports.

12. The method of claim 1, further comprising, prior to the detecting, receiving, at the computing device:
the one or more connection constraints; and
the parameters for creating the 3D object corresponding to the 3D model using the output device,
wherein the detecting is based at least in part on the one or more connection constraints, the parameters, and properties of the output device.

13. The method of claim 12, wherein the detecting comprises detecting, based on the properties and the parameters, the at least one area.

14. A non-transitory computer readable storage medium having executable instructions stored thereon, that if executed by a processor of a computing device, cause the processor to perform operations, the instructions comprising:
instructions for detecting at least one area of a three dimensional (3D) model that needs to be supported;
instructions for generating contact points for the at least one area by distributing the contact points across the at least one area, wherein distances between neighboring contact points are based at least in part on properties of an output device configured to create a 3D object corresponding to the 3D model, the output device properties including one or more of a nozzle diameter range and maximum output dimensions; and
instructions for creating a set of virtual supports, each virtual support in the set extending downward from a respective one of the contact points;
instructions for identifying connections between the virtual supports in the set, the connections satisfying one or more connection constraints including one or more of a maximum connection length, a minimum connection slope, a connection angle constraint with respect to one of the virtual supports or the surface, and an intersection constraint restricting connections determined to intersect with the 3D model;
instructions for selecting a virtual support in the set to be a trunk, the selecting based on comparing connectivity levels of the virtual supports in the set, the connectivity level of each of the virtual supports in the set determined based on a number of connections between the respective virtual support and other virtual supports in the set;
instructions for defining a support structure for the 3D model, the support structure including the trunk, virtual supports connected to the trunk, and the connections between the trunk and the virtual supports; and
instructions for sending parameters for creating the 3D object to the output device so that an operation of the output device is controlled based on the parameter, the parameters including the support structure and one or more of a scaling factor, a layer height a scaffolding material, and a printing material.

15. The non-transitory computer readable storage medium of claim 14, wherein the instructions for selection further comprise instructions for selecting a virtual support having a maximal number of connections as the trunk.

16. A system comprising:
an output device configured to create a three dimensional (3D) object corresponding to a 3D model, the output device having properties including one or more of a nozzle diameter range and maximum output dimensions; and
a computing device communicatively coupled to the output device, the computing device including a processor and a memory having instructions stored thereon, that, if executed by the processor, cause the processor to perform operations for producing the 3D object, the operations comprising:
generating contact points for at least one area of the 3D model that needs to be supported by distributing the contact points across the at least one area, wherein distances between neighboring contact points are based at least in part on the properties of the output device;

creating a set of virtual supports, each virtual support in the set extending downward from a respective one of the contact points;
identifying connections between the virtual supports in the set, the connections satisfying one or more connection constraints including one or more of a maximum connection length, a minimum connection slope, a connection angle constraint with respect to one of the virtual supports or the surface, and an intersection constraint restricting connections determined to intersect with the 3D model;
selecting a virtual support in the set to be a trunk, the selecting based on comparing connectivity levels of the virtual supports in the set, the connectivity level of each of the virtual supports in the set determined based on a number of the connections between the respective virtual support and other virtual supports in the set;
defining an adaptive support structure for the 3D model, the adaptive support structure including the trunk, one or more virtual supports connected to the trunk, and connections between the trunk and the one or more virtual supports; and
sending parameters for creating the 3D object to the output device so that an operation of the output device is controlled based on the parameter, the parameters including the adaptive support structure and one or more of a scaling factor, a layer height a scaffolding material, and a printing material.

17. The system of claim 16, wherein the generating comprises:
converting the 3D model into a plurality of two dimensional (2D) layers;
detecting the least one area of the three dimensional (3D) model that needs to be supported; and
generating the contact points for the at least one area in portions of respective ones of the plurality of 2D layers comprising the at least one area.

18. The system of claim 16, further comprising:
the output device communicatively coupled to the computing device, the output device being configured to create the 3D object corresponding to the 3D model, the operations further comprising:
storing the 3D model and the adaptive support structure in the memory; and
receiving the properties of the output device and the parameters for creating the 3D object at the output device.

19. The system of claim 18 wherein: the output device is a 3D printer; and
the generating comprises distributing the contact points uniformly across the at least one area so that each of the contact points is the same distance from neighboring contact points, the distance being based on properties of the 3D printer.

\* \* \* \* \*